(12) United States Patent
Campbell

(10) Patent No.: US 10,126,418 B1
(45) Date of Patent: Nov. 13, 2018

(54) PULSE-DOPPLER RADA MEASUREMENT OF CROSSING TARGET DYNAMICS

(71) Applicant: Waymo LLC, Mountain View, CA (US)

(72) Inventor: Timothy Campbell, Los Angeles, CA (US)

(73) Assignee: Waymo LLP, Mountain View, CA (US)

( * ) Notice: Subject to any disclaimer, the term of this patent is extended or adjusted under 35 U.S.C. 154(b) by 393 days.

(21) Appl. No.: 14/847,579

(22) Filed: Sep. 8, 2015

(51) Int. Cl.
*G01S 13/93* (2006.01)
*G01S 13/10* (2006.01)
*G01S 13/66* (2006.01)

(52) U.S. Cl.
CPC ............ *G01S 13/103* (2013.01); *G01S 13/66* (2013.01)

(58) Field of Classification Search
CPC ............................... G01S 13/103; G01S 13/66
USPC ........................................................ 342/70–72
See application file for complete search history.

(56) References Cited

U.S. PATENT DOCUMENTS

| | | | |
|---|---|---|---|
| 6,078,281 A | 6/2000 | Milkovich | |
| 6,085,151 A * | 7/2000 | Farmer | G01S 7/023 342/70 |
| 6,243,037 B1 * | 6/2001 | Pulford | G01S 13/003 342/107 |
| 6,944,543 B2 * | 9/2005 | Prakah-Asante | B60R 21/013 180/167 |
| 6,989,782 B2 | 1/2006 | Walker | |
| 7,522,089 B2 | 4/2009 | Radza | |
| 7,991,550 B2 * | 8/2011 | Zeng | G01S 7/4026 340/435 |
| 8,169,359 B2 | 5/2012 | Aoyagi | |
| 8,244,458 B1 * | 8/2012 | Blackburn | G08G 1/166 340/435 |
| 8,779,969 B2 * | 7/2014 | Shimizu | G01S 7/412 342/106 |
| 8,825,259 B1 * | 9/2014 | Ferguson | G05D 1/0214 104/124 |
| 2005/0134440 A1 * | 6/2005 | Breed | B60N 2/2863 340/435 |

(Continued)

FOREIGN PATENT DOCUMENTS

WO 2014184024 A1 11/2014

*Primary Examiner* — Marcus E Windrich
(74) *Attorney, Agent, or Firm* — McDonnell Boehnen Hulbert and Berghoff LLP

(57) ABSTRACT

Disclosed herein are embodiments that relate to crossing target dynamics for a radar system. In one aspect, the present application describes a method for use with a radar system. The method includes transmitting at least one signal pulse. The method also includes receiving a signal associated with reflection of the at least one transmitted signal pulse. Further, the method may also include processing the received signal to determine a cross-range rate. The processing may include determining a Doppler bandwidth based on the received signal. Additionally, the processing may include determining a range based on the received signal. Yet further, the processing may include determining a cross-range extent based on the received signal. Additionally, the processing may include determining the cross-range rate for the target object based on the determined Doppler bandwidth, range, and cross-range extent. An autonomous vehicle may be controlled based on the determined cross-range rate.

19 Claims, 6 Drawing Sheets

(56) References Cited

U.S. PATENT DOCUMENTS

| | | | | |
|---|---|---|---|---|
| 2005/0285774 A1* | 12/2005 | Wittenberg | ........... | G01S 13/726 342/70 |
| 2007/0285303 A1* | 12/2007 | Radza | ..................... | G01S 7/414 342/62 |
| 2012/0127016 A1* | 5/2012 | Watanabe | ................ | G01S 7/412 342/70 |
| 2013/0207832 A1* | 8/2013 | Mizutani | ............... | G01S 7/4026 342/70 |
| 2013/0207834 A1* | 8/2013 | Mizutani | ................ | G01S 7/411 342/70 |

* cited by examiner

PULSE-DOPPLER RADA MEASUREMENT OF CROSSING TARGET DYNAMICS

BACKGROUND

Unless otherwise indicated herein, the materials described in this section are not prior art to the claims in this application and are not admitted to be prior art by inclusion in this section.

Radio detection and ranging (RADAR) systems can be used to actively estimate distances to environmental features by emitting radio signals and detecting returning reflected signals. Distances to radio-reflective features can be determined according to the time delay between transmission and reception. The radar system can emit a signal that varies in frequency over time, such as a signal with a time-varying frequency chip, and then relate the difference in frequency between the emitted signal and the reflected signal to a range estimate. Some systems may also estimate relative motion of reflective objects based on Doppler frequency shifts in the received reflected signals.

Some example automotive radar systems may be configured to operate at an electromagnetic wave frequency of 77 Giga-Hertz (GHz), which corresponds to millimeter (mm) electromagnetic wave lengths (e.g., 3.9 mm for 77 GHz). The radar system may be configured to transmit a radio waveform and receive a reflected waveform. A processor in the radar system may be able to determine information about a target based on the reflected waveform. For example, the processor may be configured to calculate a velocity in a direction normal to the radar system.

SUMMARY

Disclosed herein are embodiments that relate to crossing target dynamics for a radar system. In one aspect, the present application describes a method of signaling for use with a radar system. The method includes transmitting, by a radar unit, at least one signal pulse. The method also includes receiving, by the radar unit, a signal associated with reflection of the at least one transmitted signal pulse. Further, the method may also include processing the received signal to determine a cross-range rate. The processing may include determining a Doppler bandwidth based on the received signal. Additionally, the processing may include determining a range based on the received signal. Yet further, the processing may include determining a cross-range extent based on the received signal. Additionally, the processing may include determining the cross-range rate for the target object based on the determined Doppler bandwidth, range, and cross-range extent. An autonomous vehicle may be controlled based on the determined cross-range rate.

In another aspect, the present application describes an apparatus. The apparatus includes a radar unit. The radar unit has a transmitter configured to transmit at least one signal pulse. The radar unit also has a receiver configured to receive a signal associated with reflection of the at least one transmitted signal pulse. The apparatus also includes a processing unit. The processing unit may be configured to perform processing including determining a Doppler bandwidth based on the received signal. The processing unit may also be configured to perform processing including determining a range based on the received signal. The processing unit may be further configured to perform processing including determining a cross-range extent based on the received signal. Yet further, the processing unit may be configured to perform processing including determining a cross-range rate for the target object based on the determined Doppler bandwidth, range, and cross-range extent. And finally, the processing unit may be configured to control an autonomous vehicle based on the determined cross-range rate.

In yet another example, a article of manufacture is provided. The co article of manufacture may include a computing device and a computer readable medium having stored thereon program instructions that when executed by the processor cause the computing device to perform operations. The operations include transmitting, by a radar unit, at least one signal pulse. The operations also include receiving, by the radar unit, a signal associated with reflection of the at least one transmitted signal pulse. Further, the operations may also include processing the received signal to determine a cross-range rate. The operations may include determining a Doppler bandwidth based on the received signal. Additionally, the operations may include determining a range based on the received signal. Yet further, the operations may include determining a cross-range extent based on the received signal. Additionally, the operations may include determining the cross-range rate for the target object based on the determined Doppler bandwidth, range, and cross-range extent. The operations may include controlling an autonomous vehicle based on the determined cross-range rate.

In another aspect, the present application describes an apparatus. The apparatus may be configured with means for signaling for use with a radar system. The apparatus includes means for transmitting at least one signal pulse. The apparatus also includes means for receiving a signal associated with reflection of the at least one transmitted signal pulse. Further, the apparatus may also include means for processing the received signal to determine a cross-range rate. The means for processing may include means for determining a Doppler bandwidth based on the received signal. Additionally, the means for processing may include means for determining a range based on the received signal. Yet further, the means for processing may include means for determining a cross-range extent based on the received signal. Additionally, the means for processing may include means for determining the cross-range rate for the target object based on the determined Doppler bandwidth, range, and cross-range extent. The apparatus also includes means for controlling an autonomous vehicle based on the determined cross-range rate.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
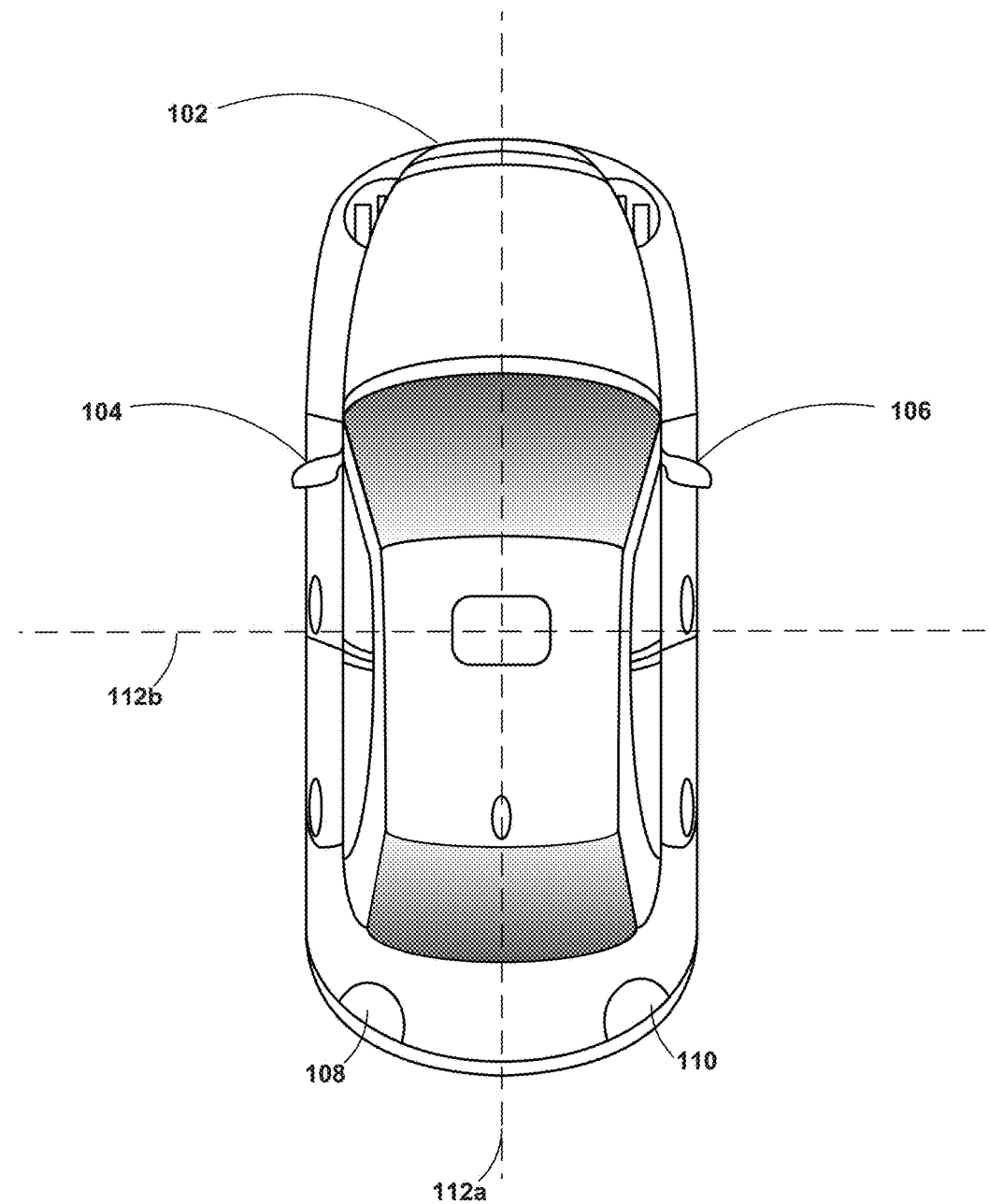
FIG. 1 illustrates an example layout of radar sectors

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The following detailed description relates to an apparatus and methods for determining crossing target dynamics for a radar system. In practice, vehicular radar systems may feature multiple radar units with each radar unit having an associated field of view. Automotive systems may feature radar systems that offer 360-degree radar coverage, thus, unless radar systems that look in a single direction, radar targets will have a higher crossing component. That is, radar systems that look in a single direction generally will determine a velocity component for a target that is normal to the radar unit (velocity moving toward or away from the radar unit), and ignore the crossing components. By combining the ability to scan a radar beam 360 degrees and novel processing techniques, crossing dynamics may be determined that aid in control of an autonomous vehicle.

Traditionally, vehicular radar systems have featured a single radar unit looking in a forward direction. These traditional radar systems would also typically only direct the radar beam in a single direction. For example, a traditional vehicular radar system may only be configured to detect the presence of another vehicle directly in front of the vehicle having the radar system. Thus, as long as a radar beam generally points in the forward direction the traditional radar system would be able to detect the vehicle.

More advanced radar systems may be used with a vehicle in order to obtain a wider field of view than just that directly in front of the vehicle. For example, it may be desirable either for a radar to be able to steer a radar beam or for a vehicle to feature multiple radar units pointing in different directions. Additionally, the radar units may be configured to detect more than just other vehicles located directly in front of the vehicle with the radar unit. Thus, the radar system may be able to interrogate different regions than just the region in front of the car. In some examples, multiple radar units may be combined with steerable radar beams to further increase the interrogation region and the imagining resolution of the vehicular radar system.

One aspect of the present disclosure provides a method for the operation of a signal processing system for a vehicular radar system. The presently disclosed system can measure object crossing speed and object cross range extent with a radar system. Because of the high frequency of operation of automotive radar systems, a radar target may have a large Doppler extent. This large Doppler extent may introduce processing errors or difficulties with traditional radar processing systems. However, the signal processing disclosed herein may use this large Doppler extent to aid in a calculation of the object crossing speed and/or object cross range extent.

Traditional radar tracking algorithms assume that the range and Doppler extent of a target is approximately matched to a size of a range filter. That is, a scatterer typically will produce a reflection signal that is nominal in both range extent and range-distance extent. For example, in a processing display a target may appear as a single 'pixel' object. When the assumption that the range and Doppler extent are small is broken, the performance of the radar system can suffer.

Therefore, by measuring the dopper bandwidth, range, and bearing angle, a cross-range rate may be calculated. These calculations may provide several useful insights.

First, the doppler and azimuth bandwidth of the object may be calculated by examining matched range filters in the neighborhood of a large peak using image processing. From these calculated bandwidths, equations may be used to directly calculate crossing speed and cross range extent.

Second, rather than performing image processing, radar detection processing may be used. An object's large Doppler extent may create multiple detections, and the disclosed approach may be used to examine the multiple detections. For example, for a pair of detections, it is possible to measure their cross-range distance and cross-range rate. This information can be used in a joint estimator to determine both (i) whether two detections arise from the same object and (ii) that object's crossing speed.

Third, the disclosed processing could be used to augment a traditional moving object autofocus algorithm. Such algorithms generally jointly estimate range, range rate, and range acceleration. A combined estimator could also include cross-range extent and cross-range rate.

A common problem when objects are resolved is that multiple tracks of a single object compete and jump from scatterer to scatterer on the object, degrading the overall quality of object tracking. For example, if an object has either a large cross-extent and/or range-distance extent, multiple points of the object may be causing the detected scattering. Thus, a radar-processing algorithm may accidently jump between the various different reflecting points. The use of different reflecting points can cause inaccuracies in calculations. For example, a velocity for an object may be calculated based on different reflecting points, resulting in an inaccurate velocity calculation. One fix for large cross-extent and/or range-distance extent is to attempt to aggregate detections that appear to arise from a single object. Another fix may be to use image processing to identify object blobs (e.g. a large amount of reflections caused by a single object). However, such attempts tend to lack robustness.

An example radar system for use with the present disclosure may include a multi-sector 90-degree field of view radar antenna architecture. This architecture enables an antenna to both scan across approximately 90 degrees of the azimuth plane (e.g. the horizontal plane) while also being mountable on various surfaces of a vehicle. Having a radar antenna with a 90-degree field of view may enable a radar system to scan a full 360-degree azimuth plane by having four radar units each configured to scan one 90-degree non-overlapping sector. Therefore, the example disclosed radar system may be able to steer a radar beam to interrogate the entire region in the azimuth plane of the vehicle. Thus, four such radars located on four corners of a car would provide a full 360-degree coverage around the car. For example, a system such as this may aid in autonomous driving of a vehicle.

When each radar unit can scan or span a 90-degree region, placing 4 radar units on a vehicle may enable the vehicle to scan a beam over the full 360-degree azimuth plane. Each of the four radar units may be configured to scan a beam over one sector (i.e. one quarter of the azimuth plane) and thus the entire plane may be scanned by the combination of the four radar units. In various examples, the placement of the radar units may be adjusted depending on the specific vehicle, the requirements of the radar system, or other design criteria. In some additional examples, the radar units may be configured to scan a region of an angular width that is not 90 degrees. For example, some radar units may scan 30 degrees, 120 degrees, or another angle. Further, in some examples, the radar units on the vehicle may scan less than the full 360-degree azimuth plane.

In some examples, the radar sectors may be defined based on where the radar units are mounted on the vehicle. In one example, one radar unit may be mounted in each of the side mirrors of the vehicle. The other two radar units may be mounted behind the taillights of the vehicle. In this example, the quadrants may be defined based on axes where one axis aligns with the direction of vehicular motion and the other axis aligns with the middle of the vehicle from front to back. In another example, the radar units may be mounted in order to have one pointing forward, one pointing backward, and one pointing to each side. In this second example, the axes of the quadrants may be at a 45 degree angle to the direction of motion of the vehicle. Additionally, the radar unit may be mounted on top of the vehicle.

The modular multi-sector 90-degree field of view radar antenna architecture may be able to steer the radar beams emitted from each radar unit. The radar beams may be steered by the radar units in various ways. For example, in some embodiments, the radar units may be able to steer the beam in an approximately continuous manner across the 90-degree field of view for the respective antenna or the radar units may be configured with sectoral sub beams spanning the 90 degrees. In other embodiments, the radar units may be able to steer the radar beam to predetermined directions within the 90-degree field of view for the respective antenna.

FIG. 1 illustrates an example layout of radar sectors for an autonomous vehicle 102. As shown in FIG. 1, each of the radar sectors may have an angular width approximately equal to the scanning range of the radar units (as will be described with respect to FIG. 2). For example, the sectors of FIG. 1 divide the azimuth plane around the autonomous vehicle 102 into 90-degree sectors. However, in examples where the radar units are configured to scan a radar beam over a different angle than 90 degrees, the width and number of sectors may change.

As shown in FIG. 1, the radar sectors may align with the axes (112a and 112b) of the vehicle 102. For example, there may be a front left, front right, rear left, and rear right sector defined by the midpoints of the vehicle 102. Because each sector corresponds to one radar unit, each radar unit may be configured to scan across one sector. Further, because each example radar unit of FIG. 1 has a scanning angle of approximately 90 degrees, each radar unit scans a region that approximately does not overlap with the scanning angle of any other radar unit. The layout of radar sectors shown in FIG. 1 is one example. Other possible layouts of radar sectors are possible as well.

In order to achieve radar sectors defined by the midpoints of the vehicle 102, each radar unit may be mounted at a 45 degree angle with respect to the two axes of the vehicle 102. By mounting the radar units a 45 degree angle with respect to the two axes of the vehicle 102, a 90 degree scan of the radar unit would scan from one vehicle axis to the other vehicle axis. For example, a radar unit mounted at a 45 degree angle to the axes in side mirror unit 104 may be able to scan the front left sector (i.e. from the vertical axis 112a through the front of the vehicle 102 to the axis 112b that runs through the side of the vehicle). An additional radar unit mounted at a 45 degree angle to the axes in side mirror unit 106 may be able to scan the front right sector. In order to scan the back right sector, a radar unit may be mounted in taillight unit 110. Additionally, in order to scan the back left sector, a radar unit may be mounted in taillight unit 108. The radar unit placements shown in FIG. 1 are merely one example. In various other examples, the radar units may be placed in other locations, such as on top of the vehicle, or within or behind other vehicle components. Further, the sectors may also be defined differently in various embodiments. For example, the sectors may be at a 45 degree angle with respect to the vehicle. In this example, one radar unit may face forward, another backward, and the other two to the sides of the vehicle.

In some examples, all the radar units of vehicle 102 may be configured with the same scanning angle. The azimuth plane around the vehicle is equal to a full 360 degrees. Thus, if each radar unit is configured with the same scanning angle, then the scanning angle for the radar units would be equal to approximately 360 degrees divided by the number of radar units on the vehicle, for full azimuth plane scanning If the vehicle 102 had two radar units, each would scan approximately 180 degrees. For three radar units, each would be configured to scan 120 degrees. For four radar units, as shown in FIG. 1, each may scan approximated 90 degrees. Five radar units may be configured on the vehicle 102 and each may be able to scan 72 degrees. Further, six radar units may be configured on the vehicle 102 and each may be able to scan approximately 60 degrees.

The number of radar units may be chosen based on a number of criteria, such as ease of manufacture of the radar units, vehicle placement, or other criteria. For example, some radar units may be configured with a planar structure that is sufficiently small. The planar radar unit may be mountable at various positions on a vehicle. For example, a vehicle may have a dedicated radar housing mounted on the top of the vehicle. The radar housing may contain various radar units. However, in other embodiments, radar units may be placed within the vehicle structure.

When radar units are located within the vehicle structure, each may not be visible from outside the vehicle without removing parts of the vehicle. Thus, the vehicle may not be altered aesthetically, cosmetically, or aerodynamically from adding radar units. For example, radar units may be placed under vehicle trim work, under bumpers, under grills, within housings for lights, within side mirrors, or other locations as well. In some embodiments, it may be desirable to place radar units in positions where the object covering the radar unit is at least partially transparent to radar. For example, various plastics, polymers, and other materials may form part of the vehicle structure and cover the radar units, while allowing the radar signal to pass through.

Additionally, in some embodiments, the radar units may be configured with different scanning ranges for different radar units. For example, in some embodiments a specific radar unit with a wide scanning angle may not be able to be placed on the vehicle in the proper location. Thus, a smaller radar unit, with a smaller scanning angle may be placed in that location. However, other radar units may be able to have larger scanning angles. Therefore, the total scanning angle of the radar units may add up to 360 degrees (or more) and provide full 360 degree azimuthal scanning For example, a vehicle may have three radar units that each scan over 100 degrees and a fourth radar unit that scans over 60 degrees. Thus, the radar units may be able to scan the full azimuth plane, but the scanning sectors may not be equal in angular size.

Figure 2:
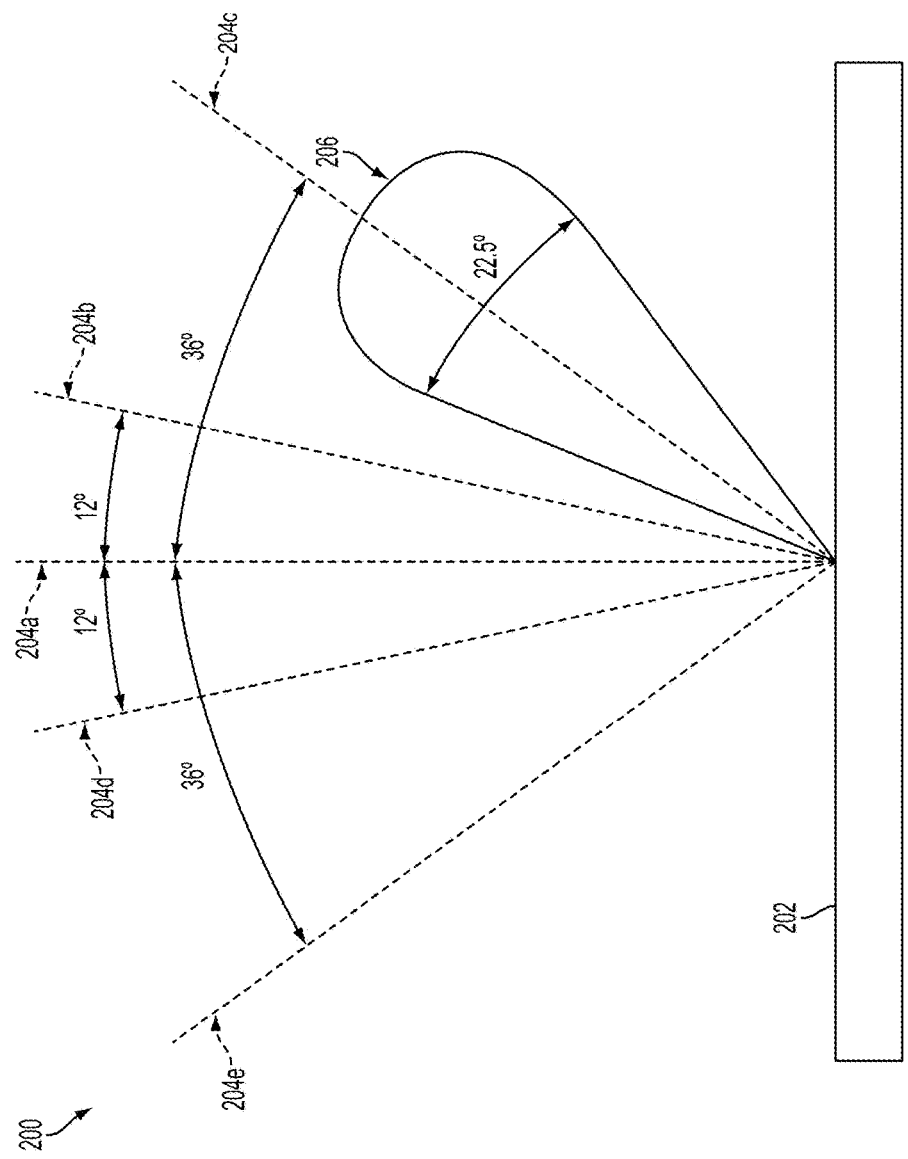
FIG. 2 illustrates example beam steering for a sector for a radar unit.

FIG. 2 illustrates example beam steering for a sector for a radar unit 200. The radar unit 200 may be configured with a steerable beam, i.e., the radar unit 200 may be able to control a direction in which the beam is radiated. By controlling the direction in which the beam is radiated, the radar unit 200 may be able to direct radiation in a specific direction in order to determine radar reflections (and thus objects) in that direction. In some embodiments, the radar unit 200 may be able to scan a radar beam in a continuous manner across the various angles of the azimuth plane. In other embodiments, the radar unit 200 may be able to scan the radar beam in discrete steps across the various angles of the azimuth plane.

The example radar unit 200 in FIG. 2 has a radar beam 206 that can be steered across a plurality of different angles. As shown in FIG. 2, the radar beam 206 may have a half-power beamwidth of approximately 22.5 degrees. The half-power beamwidth describes the width, measured in degrees, of a main lobe of the radar beam 206 between two points that correspond to half the amplitude of the maximum of the radar beam 206. In various embodiments, the half-power beamwidth of the radar beam 206 may be different than 22.5 degrees. Additionally, in some embodiments, the half-power beamwidth of the radar beam 206 may change depending on the angle at which the radar beam 206 is pointed. For example, the half-power beamwidth of the radar beam 206 may be narrower when the radar beam 206 is pointed more closely to the orthogonal 204a (i.e. broadside) direction to the radiating surface and widen and the radar beam 206 is steered away from the orthogonal direction 204a.

In the example shown in FIG. 2, the radar beam may be able to be steered to four different angles. The steering angle may be measured with respect to the orthogonal 204a (i.e. broadside) direction to the radiating surface. The beam may be steered to +36 degrees at 204c and −36 degrees at 204e. Also, the beam may be steered to +12 degrees at 204b and −12 degrees at 204d. The four different angles may represent the discrete angles to which the radar beam 206 may be steered. In some additional examples, the radar beam may be able to be steered to two angles simultaneously. For example, the radar beam may be steered to both +12 and −12 degrees at the same time. This may result in a beam that is overall steered in the direction of the sum of the angles (e.g. −12+12=0, thus the beam in this example would be in the broadside direction 204a). However, when a radar beam is steered at two directions at once, the half-power beamwidth of the radar beam may be widened. Thus, a radar resolution may decrease.

By steering the radar beam 206 to each of angles 204b-204e, the full 90 degree field of view can be scanned. For example, when the radar beam 206 is steered to +36 degrees 204c, the half-power beamwidth of the radar beam 206 will cover from +47.25 degrees to +24.75 degrees (as measured from the broadside direction 204a). Additionally, when the radar beam 206 is steered to −36 degrees, the half-power beamwidth of the radar beam 206 will cover from −47.25 degrees to −24.75 degrees. Further, when the radar beam 206 is steered to +12 degrees 204b, the half-power beamwidth of the radar beam 206 will cover from +23.25 degrees to +0.75 degrees. And finally, when the radar beam 206 is steered to −12 degrees 204d, the half-power beamwidth of the radar beam 206 will cover from −23.25 degrees to −0.75 degrees. Thus, the radar beam 206 will effectively be able to scan (i.e. selectively enable or disable the four beams spanning the angular width) from −47.25 to +47.25 degrees, covering a range of 95 degrees. The number of steering angles, the direction of the steering angles, and the half-power beamwidth of the radar beam 206 may be varied depending on the specific example.

For example, and further discussed below, a radar beam of a radar unit may be configured to only scan a 60 degree region. If a radar unit can scan a 60 degree region, six radar units may be used to scan a full 360 azimuth plane. However, if the radar unit can scan 90 degrees, four radar units may scan the full 360 azimuth plane.

Figure 3A:
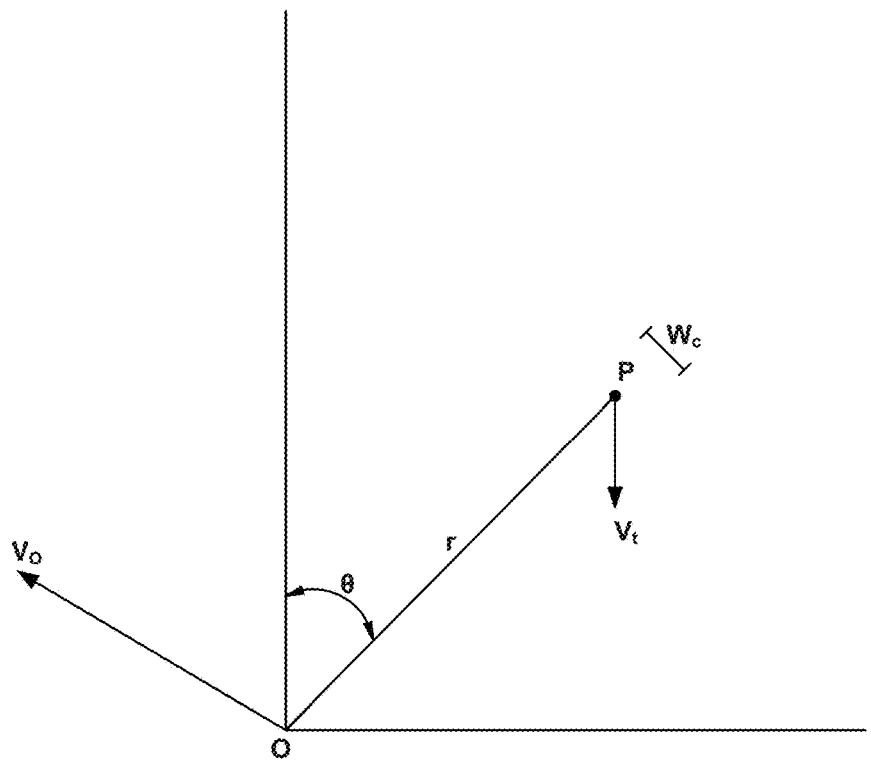
FIG. 3A illustrates an example coordinate plane.

FIG. 3A illustrates an example coordinate plane for use within the context of the present disclosure. As disclosed with respect to the coordinate plane of FIG. 3A, the present disclosure uses the following variables: the position of the radar unit (O), the position of the target (P), the angle between a position of the radar unit and the target's velocity ($\theta$), the target velocity ($V_t$), the radar unit's velocity ($V_o$), the cross-range extent ($w_c$), and the range to the target (r). The variables will be used throughout the present disclosure. The range rate and cross-range rate are defined as follows:

$$RangeRate = \frac{dr}{dt} = [\cos(\theta)\sin(\theta)](V_t - V_o)$$

$$CrossRangeRate = \frac{ds}{dt} = [-\sin(\theta)\cos(\theta)](V_t - V_o)$$

Figure 3B:
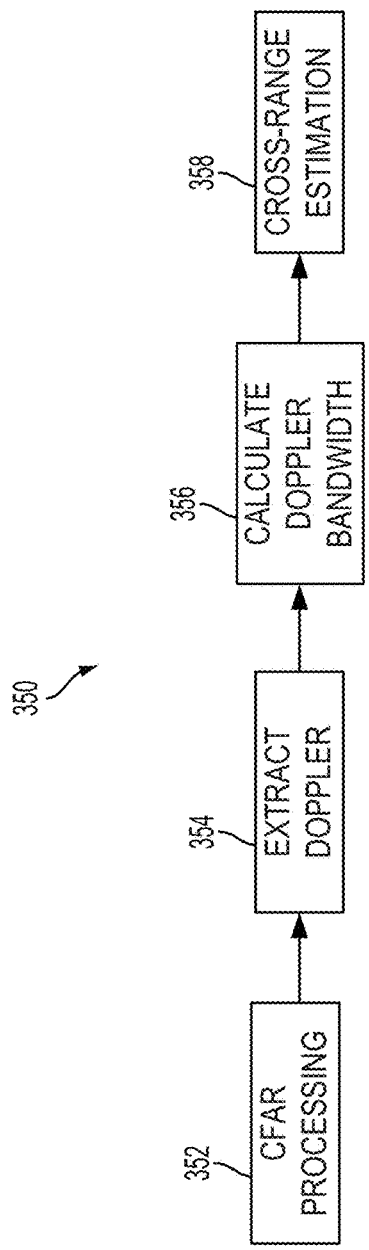
FIG. 3B illustrates an example radar DSP system for determining crossing target dynamics.

FIG. 3B illustrates an example radar DSP system for determining crossing target dynamics. The example DSP system 350 includes blocks for CFAR Processing 352, Extract Doppler 354, Calculate Doppler Bandwidth 356, and Cross-Range Estimation 358. Although the blocks are shown in a generally linear order, the order, alignment, and sequence of blocks may be different in various embodiments. In some further examples, blocks of FIG. 3B may be combined into fewer or divided into more blocks.

The CFAR processing block 352, may include performing Constant False Alarm Rate (CFAR) processing on received radar reflection signals. CFAR is an adaptive radar-detection algorithm configured to detect reflection signals in a received radar signal. The CFAR algorithm may be adaptable to determine both a threshold detection level as well as a detection level to reduce clutter and interference. Although block 352 is described as CFAR processing, other radar-processing algorithms may be used as well.

As previously discussed, traditional radar tracking algorithms, such as CFAR, assume that the Doppler and range extent of a target is approximately matched to the size of range and Doppler matched filters. That is, a target typically will produce a reflected phase history that is nominal in both Doppler extent and range extent. For example, in a processing display a scatterer may appear as a single 'pixel' object. When the assumption that the Doppler and range extent are small is broken, the performance of the radar system can suffer. However, these features may be exploited by the present system in order to obtain cross-range information about abut a target.

The processing described herein may be performed as image processing. The output of the CFAR processing block 352 may be an image based on the received radar reflection signals. The image produced from the CFAR processing block 352 may be a two dimensional image. On one axis, each image pixel may correspond to one of a plurality of range filters of the radar processing system. On the other axis, the Doppler shift in Hertz is plotted. Thus, the image plots the various Doppler reflections for various ranges of the reflection signal. Although the data is described as an image, the data may take the form of image data and never be rendered into a viewable image.

After the CFAR processing block 352, the system may perform block 354 Extract Doppler Subband around a respective detected point. By extracting the Doppler subband, a range of Doppler reflection signals may be extracted that correspond to a target. For example, when processing an image (like the above-described image), the Doppler subband may be a region around a detection point that has sufficiently high detection levels. In one example, a Doppler subband may be extracted within a single range bin or across multiple range bins. In another example, the various Doppler subband points that are extracted may be individual points that each have a reflection signal above a threshold. In yet another example, the various Doppler subband points that are extracted may be a continuous span of Doppler spectrum where each portion has a reflection signal above a threshold.

After extracting a Doppler Subband, the Doppler bandwidth may be calculated at block 356. The Doppler bandwidth may be calculated based on the image as well. The Doppler bandwidth may be the difference between the highest and lowest Doppler shift within an identified Doppler subband. For example, the Doppler bandwidth may correspond to the difference between a Doppler shift of a highest Doppler shift point having a reflection above the threshold and the Doppler shift of a lowest Doppler shift point having a reflection above the threshold. The cross-range extent of an object will cause the object to occupy some portion of the Doppler spectrum. Expressed in meters per second the space occupied in Doppler Bandwidth ($B_d$) is, $$B_d = \left| [\cos(\theta)\sin(\theta)](V_t - V_o) - \left[\cos\left(\theta + \operatorname{atan}\left(\frac{w_c}{r}\right)\right)\sin\left(\theta + \operatorname{atan}\left(\frac{w_c}{r}\right)\right)\right](V_t - V_o) \right|$$

A Taylor expansion of the functions above about θ gives an approximation, $$B_d = \left| [-\sin(\theta)\cos(\theta)](V_t - V_o)\operatorname{atan}\left(\frac{w_c}{r}\right) \right|$$

After calculating a Doppler bandwidth, the cross-range rate may be calculated at block 358. Substituting in the value of cross-range rate gives the following:

$$B_d = \left| \frac{ds}{dt} \operatorname{atan}\left(\frac{w_c}{r}\right) \right|$$

Solving the equation for the cross-range rate gives the following:

$$\frac{ds}{dt} = \frac{B_d}{\operatorname{atan}\left(\frac{w_c}{r}\right)}$$

Thus, the cross-range rate may be based on the Doppler bandwidth, the cross-range extent, and the range of a reflecting object. The cross-range rate may be used by an autonomous vehicle to help control the autonomous vehicle. For example, the cross-range rate of an object may be used to control the autonomous vehicle so as to avoid the object.

Figure 4:
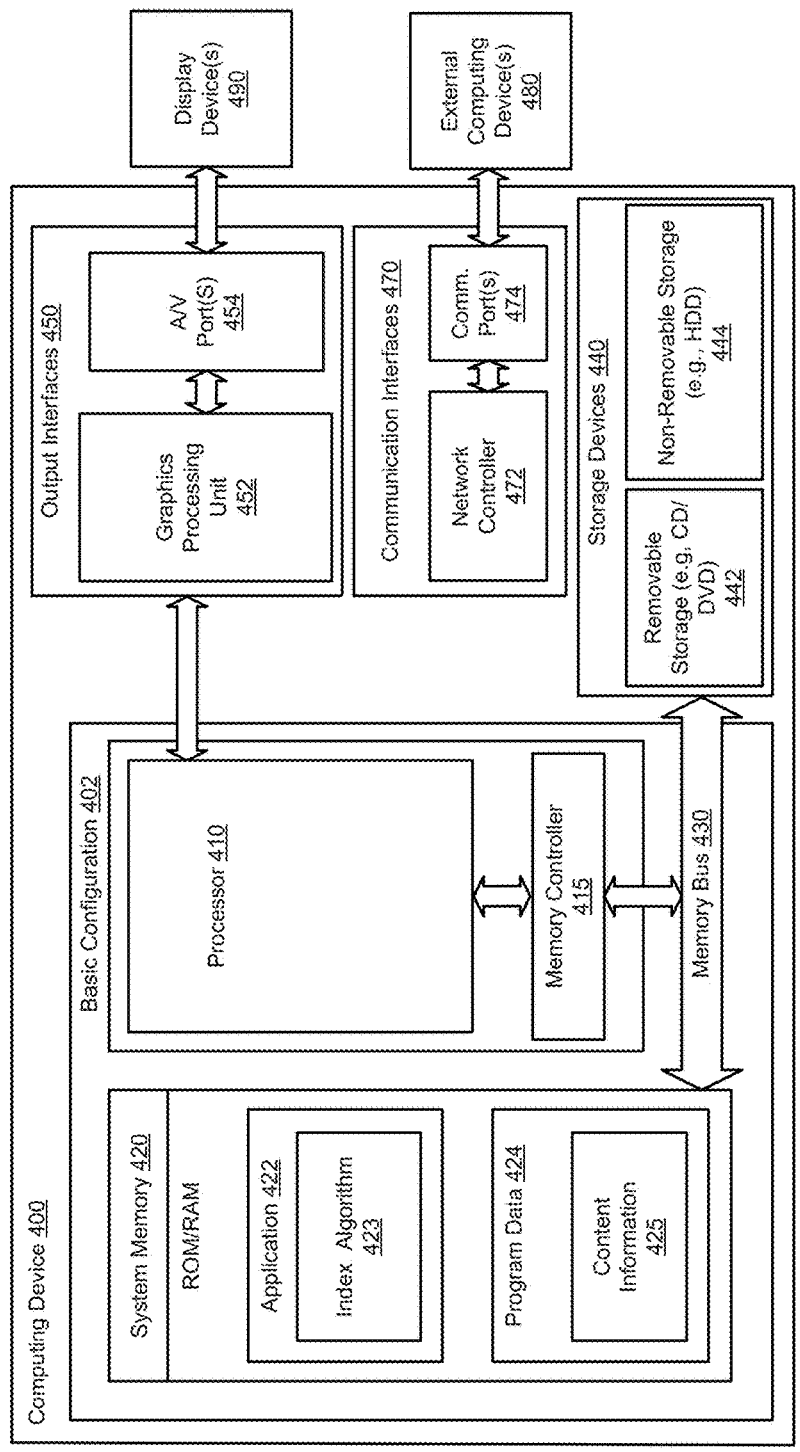
FIG. 4 illustrates an example computing device for performing some of the methods disclosed herein.

FIG. 4 illustrates a functional block diagram of a computing device 400, according to an embodiment. The computing device 400 can be used to perform functions in connection with radar units. In particular, the computing device can be used to perform some or all of the functions discussed above in connection with FIGS. 1-3 and FIG. 5 below. As shown in FIG. 4, the external computing device(s) 480 may be additional computing devices located external to the computing device 400.

The computing device 400 can be or include various types of devices, such as, for example, a server, personal computer, mobile device, cellular phone, or tablet computer. In a basic configuration 402, the computing device 400 can include one or more processors 410 and system memory 420. A memory bus 430 can be used for communicating between the processor 410 and the system memory 420. Depending on the desired configuration, the processor 410 can be of any type, including a microprocessor (μP), a microcontroller (μC), or a digital signal processor (DSP), among others. A memory controller 415 can also be used with the processor 410, or in some implementations, the memory controller 415 can be an internal part of the processor 410.

Depending on the desired configuration, the system memory 420 can be of any type, including volatile memory (such as RAM) and non-volatile memory (such as ROM, flash memory). The system memory 420 can include one or more applications 422 and program data 424. The application(s) 422 can include an index algorithm 423 that is arranged to provide inputs to the electronic circuits. The program data 424 can include content information 425 that can be directed to any number of types of data. The application 422 can be arranged to operate with the program data 424 on an operating system.

The computing device 400 can have additional features or functionality, and additional interfaces to facilitate communication between the basic configuration 402 and any devices and interfaces. For example, data storage devices 440 can be provided including removable storage devices 442, non-removable storage devices 444, or both. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives. Computer storage media can include volatile and nonvolatile, non-transitory, removable and non-removable media implemented in any method or technology for storage of information, such as computer readable instructions, data structures, program modules, or other data.

The system memory 420 and the storage devices 440 are examples of computer storage media. Computer storage media includes, but is not limited to, RAM, ROM, EEPROM, flash memory or other memory technology, CD-ROM, DVDs or other optical storage, magnetic cassettes, magnetic tape, magnetic disk storage or other magnetic storage devices, or any other medium that can be used to store the desired information and that can be accessed by the computing device 400.

The computing device 400 can also include output interfaces 450 that can include a graphics processing unit 452, which can be configured to communicate with various external devices, such as display devices 490 or speakers by way of one or more A/V ports or a communication interface 470. The communication interface 470 can include a network controller 472, which can be arranged to facilitate communication with one or more other computing devices, such as external computing device(s) 480, over a network communication by way of one or more communication ports 474. The communication connection is one example of communication media. Communication media can be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR), and other wireless media.

The computing device 400 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 400 can also be implemented as a personal computer including both laptop computer and non-laptop computer configurations.

The disclosed methods can be implemented as computer program instructions encoded on a non-transitory computer-readable storage medium in a machine-readable format, or on other non-transitory media or articles of manufacture. The computer program product includes a computer program for executing a computer process on a computing device, arranged according to some disclosed implementations.

The computer program product is provided using a signal bearing medium. The signal bearing medium can include one or more programming instructions that, when executed by one or more processors, can provide functionality or portions of the functionality discussed above in connection with FIGS. 1-3 and FIG. 5. In some implementations, the signal bearing medium can encompass a computer-readable medium such as, but not limited to, a hard disk drive, a CD, a DVD, a digital tape, or memory. In some implementations, the signal bearing medium can encompass a computer-recordable medium such as, but not limited to, memory, read/write (R/W) CDs, or R/W DVDs. In some implementations, the signal bearing medium can encompass a communications medium such as, but not limited to, a digital or analog communication medium (for example, a fiber optic cable, a waveguide, a wired communications link, or a wireless communication link). Thus, for example, the signal bearing medium can be conveyed by a wireless form of the communications medium (for example, a wireless communications medium conforming with the IEEE 802.11 standard or other transmission protocol).

The one or more programming instructions can be, for example, computer executable instructions. A computing device (such as the computing device 400 of FIG. 4) can be configured to provide various operations in response to the programming instructions conveyed to the computing device by one or more of the computer-readable medium, the computer recordable medium, and the communications medium.

Figure 5:
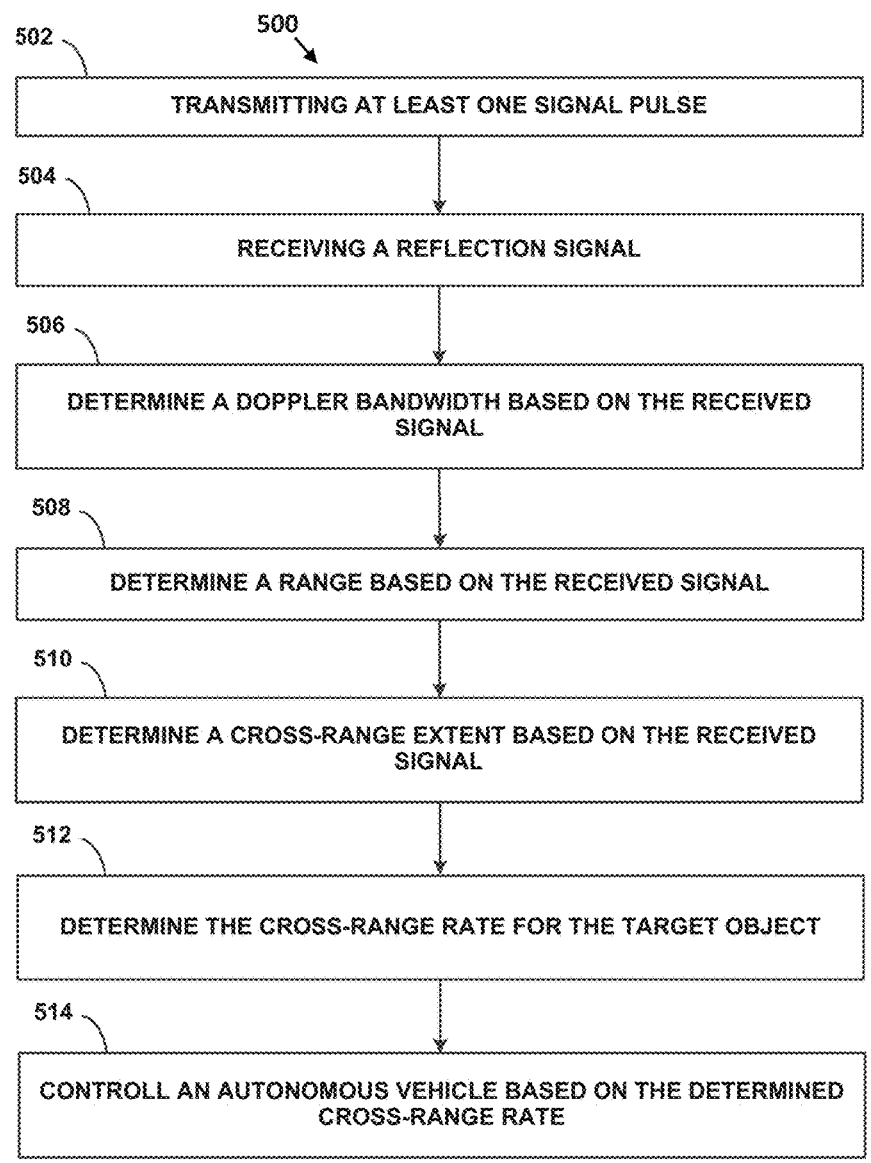
FIG. 5 illustrates an example method for determining crossing target dynamics.

FIG. 5 is an example method 500 for determining crossing target dynamics. Although shown in sequential order, various blocks may be performed in parallel or in a different order. At block 502, the method 500 includes transmitting at least one signal pulse with a radar system. In some examples, the transmitted pulse may be a linear frequency modulated (LFM) signal and each transmitted pulse may be a chirp signal mixed with a binary phase-shift keying (BPSK) encoding to form the modulated signal for transmission. The signal transmitted by the transmitter may have other properties designed to cause multiple-input multiple-output (MIMO) characteristics that may reduce interference between the various radar units of a vehicle.

At block 504, the method 500 includes receiving a reflection signal. The reflection signal may be a single reflection or a signal including several reflected signals. The reflection signals may be reflected from objects within the field of view of the radar system. The reflection signals may be received by an antenna or antenna system of the radar system. The antenna may output signals based on the received reflections for further processing by the radar system.

In some examples of method 500, the processing and determining may be based on image processing, as described with respect to example DSP system 350. As discussed, an image produced may be a two dimensional image. On one axis, each image pixel may correspond to one of a plurality of range filters of the radar processing system. On the other axis, the Doppler shift in hertz is plotted. Thus, the image plots the various Doppler reflections for various ranges of the reflection signal. Although the data is described as an image, the data may take the form of image data and never be rendered into a viewable image.

At block 506, the method 500 includes determining a Doppler Bandwidth based on the received signal. The Doppler bandwidth may be the difference between the highest and lowest Doppler shift in a within an identified Doppler subband. For example, the Doppler bandwidth may correspond to the difference between a Doppler shift of a highest Doppler shift point having a reflection above the threshold and the Doppler shift of a lowest Doppler shift point having a reflection above the threshold. The cross-range extent of an object will cause the object to occupy some portion of the Doppler spectrum.

At block 508, the method 500 includes determining a range based on the received signal. The range may be determined based on determining which of the range filters (or pixels along an axis of the image) correspond to the reflection signal. During operation, the range filter corresponding to the reflection signal will indicate a range of the reflection signal.

At block 510, the method 500 includes determining a cross-range extent based on the received signal. The cross-range extent may be determined in various ways. For example, the cross-range extent may be determined based on other systems of an autonomous vehicle. For example, traditional imaging may be able to identify objects and use a lookup table to determine cross-range extent. In other examples, scanning of radar beams may be used to determine a cross-range extent of a reflecting object. The cross-range extent of an object may be based on the angular width of the object. Further, the cross-range extent of the object may be a physical width of the reflecting object.

At block 512, the method 500 includes determining a cross range rate based on the received signal. As previously discussed, expressed in meters per second the space occupied in Doppler Bandwidth ($B_d$) is, $$B_d = \left| [\cos(\theta)\sin(\theta)](V_t - V_o) - \left[\cos\left(\theta + \operatorname{atan}\left(\frac{w_c}{r}\right)\right)\sin\left(\theta + \operatorname{atan}\left(\frac{w_c}{r}\right)\right)\right](V_t - V_o) \right|$$

A Taylor expansion of the functions above about θ gives an approximation, $$B_d = \left| [-\sin(\theta)\cos(\theta)](V_t - V_o)\operatorname{atan}\left(\frac{w_c}{r}\right) \right|$$

After calculating a Doppler bandwidth, the cross-range rate may be calculated. Substituting in the value of cross-range rate gives the following:

$$B_d = \left| \frac{ds}{dt} \operatorname{atan}\left(\frac{w_c}{r}\right) \right|$$

Solving the equation for the cross-range rate gives the following:

$$\frac{ds}{dt} = \frac{B_d}{\operatorname{atan}\left(\frac{w_c}{r}\right)}$$

At block 514, the autonomous vehicle may be controlled based on the determined cross-range rate. The cross-range rate may give a crossing speed for various objects that are causing the reflections. For example, the cross-range rate may give a crossing speed for another vehicle approaching an intersection. Thus, the cross-range rate may be an effective calculation for object avoidance for an autonomous vehicle.

It should be understood that various processes, including but not limited to those described above, may be involved with the radiating, reception, and/or modulation. It should also be understood that arrangements described herein are for purposes of example only. As such, those skilled in the art will appreciate that other arrangements and other elements (e.g., machines, apparatuses, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. A method, comprising:
   transmitting, by a radar unit, at least one signal pulse;
   receiving, by the radar unit, a signal associated with reflection of the at least one transmitted signal pulse;
   processing the received signal to determine a cross-range rate for a target object, wherein the processing comprises:
   determining a Doppler bandwidth based on the received signal, wherein the Doppler bandwidth represents a difference between a first Doppler shift and a second Doppler shift within a Doppler subband;
   determining a range based on the received signal;
   determining a cross-range extent based on the received signal; and
   determining the cross-range rate for the target object based on the determined Doppler bandwidth, range, and cross-range extent, wherein the cross-range rate is calculated by dividing the Doppler bandwidth by the arctangent of the cross-range extent divided by the range; and
   controlling an autonomous vehicle based on the determined cross-range rate.

2. The method according to claim 1, wherein the cross-range extent is determined based on a number of range filters over which a reflection in the received signal is observed.

3. The method according to claim 1, further comprising identifying two scatterers associated with the received signal.

4. The method according to claim 3, further comprising performing the processing for the two scatterers.

5. The method according to claim 4, further comprising determining whether the two scatterers are both part of the target object.

6. The method according to claim 5, further comprising determining the cross-range extent for the target object based on the two scatters responsive to determining that the two scatterers are both part of the target object.

7. A radar system comprising:
   a radar unit comprising:
   a transmitter configured to transmit at least one signal pulse;
   a receiver configured to receive a signal associated with reflection of the at least one transmitted signal pulse;
   a processing unit configured to perform processing comprising:
   determining a Doppler bandwidth based on the received signal, wherein the Doppler bandwidth represents a difference between a first Doppler shift and a second Doppler shift within a Doppler subband;
   determining a range based on the received signal;
   determining a cross-range extent based on the received signal; and
   determining a cross-range rate for the target object based on the determined Doppler bandwidth, range, and cross-range extent, wherein the cross-range rate is determined by dividing the Doppler bandwidth by the arctangent of the cross-range extent divided by the range; and
   controlling an autonomous vehicle based on the determined cross-range rate.

8. The system according to claim 7, wherein the processing unit is further configured to calculate the cross-range rate by dividing the Doppler bandwidth by the arctangent of the cross-range extent divided by the range.

9. The system according to claim 7, wherein the processing unit is further configured to determine the cross-range extent based on a number of range filters over which a reflection in the received signal is observed.

10. The system according to claim 7, wherein the processing unit is further configured to identify two scatterers associated with the received signal.

11. The system according to claim 10, wherein the processing unit is further configured to perform the processing for the two scatterers.

12. The system according to claim 11, wherein the processing unit is further configured to determine whether the two scatterers are both part of the target object.

13. The system according to claim 12, wherein the processing unit is further configured to determine the cross-range extent for the target object based on the two scatters responsive to determining that the two scatterers are both part of the target object.

14. An article of manufacture including a non-transitory computer-readable medium, having stored thereon program instructions that, if executed by a computing device, cause the computing device to perform operations comprising:
  transmitting, by a radar unit, at least one signal pulse;
  receiving, by the radar unit, a signal associated with reflection of the at least one transmitted signal pulse;
  processing the received signal, wherein the processing comprises:
    determining a Doppler bandwidth based on the received signal, wherein the Doppler bandwidth represents a difference between a first Doppler shift and a second Doppler shift within a Doppler subband;
    determining a range based on the received signal;
    determining a cross-range extent based on the received signal; and
    determining a cross-range rate for the target object based on the determined Doppler bandwidth, range, and cross-range extent, wherein the cross-range rate is calculated by dividing the Doppler bandwidth by the arctangent of the cross-range extent divided by the range; and
  controlling an autonomous vehicle based on the determined cross-range rate.

15. The article of manufacture according to claim 14, wherein the cross-range extent is determined based on a number of range filters over which a reflection in the received signal is observed.

16. The article of manufacture according to claim 14, further comprising identifying two scatterers associated with the received signal.

17. The article of manufacture according to claim 16, further comprising performing the processing for the two scatterers.

18. The article of manufacture according to claim 17, further comprising determining whether the two scatterers are both part of the target object.

19. The article of manufacture according to claim 18, further comprising determining the cross-range extent for the target object based on the two scatters responsive to determining that the two scatterers are both part of the target object.

* * * * *